(12) United States Patent
Xu et al.

(10) Patent No.: US 8,208,175 B2
(45) Date of Patent: Jun. 26, 2012

(54) BLENDED ERROR DIFFUSION AND ADAPTIVE QUANTIZATION

(75) Inventors: Beilei Xu, Penfield, NY (US); Robert Paul Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 2205 days.

(21) Appl. No.: 11/104,758

(22) Filed: Apr. 13, 2005

(65) Prior Publication Data
US 2006/0232798 A1    Oct. 19, 2006

(51) Int. Cl.
*G06K 15/00* (2006.01)
(52) U.S. Cl. ......... 358/3.06; 347/15; 347/131; 347/181; 399/180; 399/181; 382/237; 348/254
(58) Field of Classification Search .................. 358/518, 358/3.23, 530, 523–525, 1.13, 1.1, 1.14, 358/1.15, 1.9, 3.06
See application file for complete search history.

(56) References Cited

U.S. PATENT DOCUMENTS

| | | |
|---|---|---|
| 4,661,859 A | 4/1987 | Mailloux et al. |
| 5,045,952 A | 9/1991 | Eschbach |
| 5,208,871 A | 5/1993 | Eschbach |
| 5,226,096 A | 7/1993 | Fan |
| 5,268,774 A | 12/1993 | Eschbach |
| 5,274,472 A | 12/1993 | Williams |
| 5,276,532 A | 1/1994 | Harrington |
| 5,278,670 A | 1/1994 | Eschbach |
| 5,282,057 A | 1/1994 | Mailloux et al. |
| 5,321,525 A | 6/1994 | Hains |
| 5,325,216 A | 6/1994 | AuYeung |
| 5,329,599 A | 7/1994 | Curry et al. |
| 5,357,273 A | 10/1994 | Curry |
| 5,374,997 A | 12/1994 | Eschbach |
| 5,383,036 A | 1/1995 | Mailloux et al. |
| 5,408,329 A | 4/1995 | Mailloux et al. |
| 5,480,240 A | 1/1996 | Bolash et al. |
| 5,483,605 A | 1/1996 | Rostamian |
| 5,493,416 A | 2/1996 | Fan |
| 5,504,462 A | 4/1996 | Cianciosi et al. |
| 5,528,384 A | 6/1996 | Metcalfe et al. |
| 5,608,821 A | 3/1997 | Metcalfe et al. |
| 5,757,976 A | 5/1998 | Shu |
| 5,838,884 A | 11/1998 | AuYeung et al. |
| 6,014,226 A | 1/2000 | Harrington et al. |
| 6,129,457 A | 10/2000 | Thompson, Jr. et al. |
| 6,167,166 A | 12/2000 | Loce et al. |
| 6,181,438 B1 | 1/2001 | Bracco et al. |
| 6,184,916 B1 | 2/2001 | Cianciosi |

(Continued)

OTHER PUBLICATIONS

Floyd and Steinberg, "An Adaptive Algorithm for Spatial Greyscale," Proceedings of the Society for Information Display, vol. 17, 1976, pp. 75-77.

(Continued)

*Primary Examiner* — Twyler Haskins
*Assistant Examiner* — Brendan McCommas
(74) *Attorney, Agent, or Firm* — Fay Sharpe LLP

(57) ABSTRACT

A target pixel is processed according to a blended combination of two or more error diffusion techniques. For example, the two or more techniques may include a standard error diffusion technique and rank ordered error diffusion. Additionally, or alternatively, a quantization resolution is selected for the target pixel based on information regarding the pixel. For example, a quantization resolution is selected based on a relative position of the target pixel or based on a value of the target pixel and/or values of pixels neighboring the target pixel.

39 Claims, 5 Drawing Sheets

U.S. PATENT DOCUMENTS

| | | | |
|---|---|---|---|
| 6,301,397 B1 | 10/2001 | Jankowski et al. | |
| 6,351,319 B1 | 2/2002 | Schweid et al. | |
| 6,353,687 B1 | 3/2002 | Schweid | |
| 6,449,396 B1 | 9/2002 | Loce et al. | |
| 6,608,700 B1 | 8/2003 | Mantell | |
| 6,731,404 B1 | 5/2004 | Zuravleff | |
| 6,738,159 B2 | 5/2004 | Harrington | |
| 6,753,978 B1 * | 6/2004 | Chang | 358/3.04 |
| 6,816,285 B1 | 11/2004 | Eschbach | |
| 7,164,499 B1 * | 1/2007 | Gupta | 358/1.9 |
| 7,312,901 B2 * | 12/2007 | Yamada et al. | 358/3.14 |
| 7,369,276 B2 * | 5/2008 | Couwenhoven et al. | 358/3.03 |
| 2002/0122210 A1 * | 9/2002 | Mitchell Ilbery | 358/3.04 |
| 2003/0090729 A1 | 5/2003 | Loce et al. | |
| 2004/0196478 A1 * | 10/2004 | Imafuku et al. | 358/1.9 |
| 2005/0030586 A1 * | 2/2005 | Huang et al. | 358/2.1 |
| 2006/0152764 A1 * | 7/2006 | Loce et al. | 358/3.06 |

OTHER PUBLICATIONS

Billotet-Hoffman and Bryngdahl, "On the Error Diffusion Technique for Electronic Halftoning," Proceedings of the Society for Information Display, vol. 24, 1983, pp. 253-258.

U.S. Appl. No. 11/013,787, filed Dec. 17, 2004, Xu, et al.

U.S. Appl. No. 11/034,057, filed Jan. 13, 2005, Loce, et al.

* cited by examiner

FIG. 4
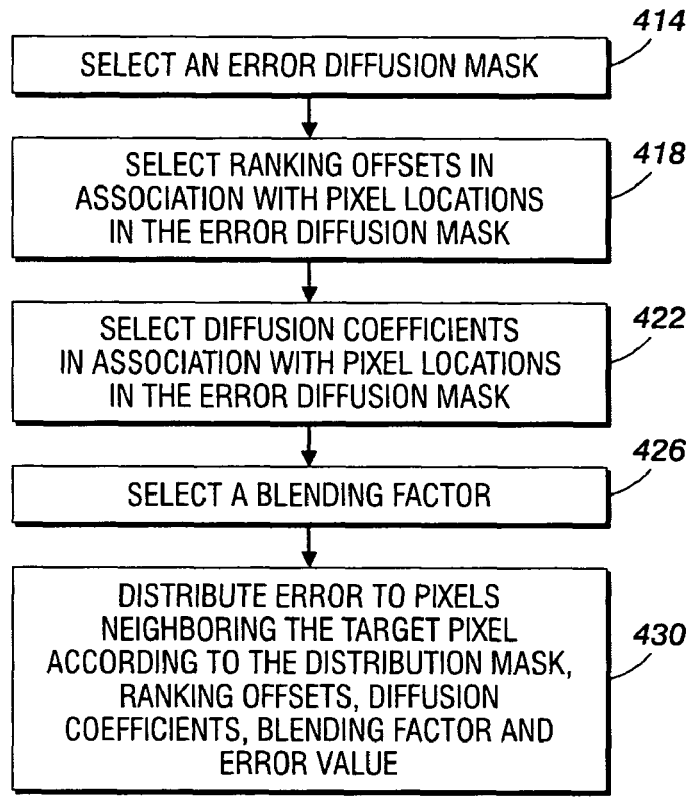
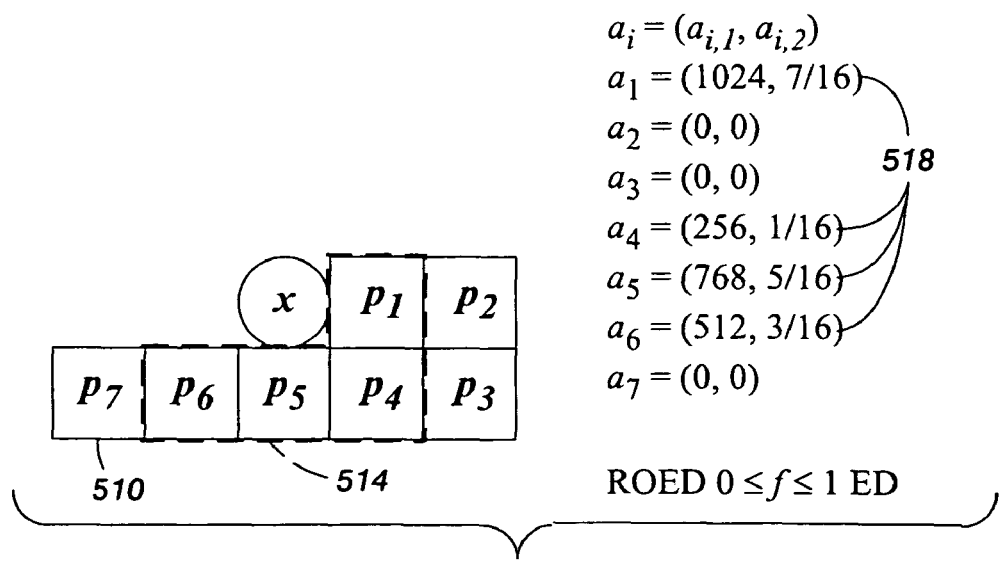
FIG. 5 where $a_i$ = (ED Ranking Offset, ROED Ranking Offset, Diffusion Coefficient)

$a_i = (a_{i,1}, a_{i,2}, a_{i,3})$
$a_1 = (1024, 256, 8/42)$
$a_2 = (768, 0, 4/42)$
$a_3 = (512, 0, 2/42)$
$a_4 = (768, 256, 4/42)$
$a_5 = (1024, 256, 8/42)$
$a_6 = (768, 256, 4/42)$
$a_7 = (512, 0, 2/42)$
$a_8 = (256, 0, 1/42)$
$a_9 = (512, 0, 2/42)$
$a_{10} = (768, 0, 4/42)$
$a_{11} = (512, 0, 2/42)$
$a_{12} = (256, 0, 1/42)$

ROED $0 \le f \le 1$ ED

Ranking Formula:

$de_1 = \min[L - p_i, ((a_{i,3} - 1)f + 1)e]$ wherein $i$ satisfies $([(1 - f)(p_i + a_{i,2}) + fa_{i,1}] = OS_1[(1 - f)(p_i + a_{i,2}) + fa_{i,1}], i \in [1,12])$ $de_2 = \min[L - p_i, a_{i,3}fe + (1 - f)(e - de_1)]$ wherein $i$ satisfies $([(1 - f)(p_i + a_{i,2}) + fa_{i,1}] = OS_2[(1 - f)(p_i + a_{i,2}) + fa_{i,1}], i \in [1,12])$ $de_3 = \min[L - p_i, a_{i,3}fe + (1 - f)(e - de_1 - de_2)]$ wherein $i$ satisfies $([(1 - f)(p_i + a_{i,2}) + fa_{i,1}] = OS_3[(1 - f)(p_i + a_{i,2}) + fa_{i,1}], i \in [1,12])$ $de_4 = \min[L - p_i, a_{i,3}fe + (1 - f)(e - de_1 - de_2 - de_3)]$ wherein $i$ satisfies $([(1 - f)(p_i + a_{i,2}) + fa_{i,1}] = OS_4[(1 - f)(p_i + a_{i,2}) + fa_{i,1}], i \in [1,12])$

BLENDED ERROR DIFFUSION AND ADAPTIVE QUANTIZATION

CROSS REFERENCE

The following applications, the disclosures of each being totally incorporated herein by reference are mentioned: Ser. No. 09/968,651 filed Oct. 1, 2001, Pub. No. 2003/0090729, published May 15, 2003 by Robert P. Loce, et al., RANK-ORDER ERROR DIFFUSION IMAGE PROCESSING; Ser. No. 11/034,057, filed Jan. 13, 2005 by Robert P. Loce, et al., SYSTEMS AND METHODS FOR CONTROLLING A TONE REPRODUCTION CURVE USING ERROR DIFFUSION; and Ser. No. 11/013,787, filed Dec. 17, 2004 by Beilei Xu, et al., SYSTEMS AND METHODS FOR RANK-ORDER ERROR DIFFUSION IMAGE PROCESSING.

BACKGROUND

The methods and systems illustrated herein in embodiments are related generally to the art of halftoning images. More specifically, embodiments are related to error diffusion (ED), rank ordered error diffusion (ROED) and issues related to quantization decisions. Embodiments find particular application where a halftoned image is scanned into an image processing system for the purpose of further processing or copying. However, embodiments are also beneficially applied wherever there is a desire to adjust image contrast. For example, embodiments may be applied to images from sources including, but not limited to, Adobe™ gray tile, JPEG uncompressed images, scanned line art and anti-aliased images (Adobe is a registered trademark of Adobe Systems Inc.).

Binary halftone images consist of a multitude of tiny marked spots on an unmarked background. The spots are laid out in a grid. For example, the spots are laid out with the structure of a halftone screen. When a halftone image is scanned, for example, during a copying procedure, it is highly unlikely that the locations of the marked and unmarked portions of the image exactly coincide with the locations of sensors in the scanning device. Therefore, a marked spot may only be partially in the field of view of a related image sensor. For this and other reasons, scanned halftone images tend to include gray edges around the halftone spots or dots. To print such grayed halftones, or grayed halftones from other sources, using a binary printer it can be necessary to convert the gray level values of the scanned image into a binary (mark or unmark) form, or to correct or remove them.

Several methods for converting grayed images into a binary form are known. For example, grayed images can be binarized through thresholding, rehalftoning and through a variety of error diffusion (ED) techniques.

Many error diffusion techniques are known. For example, the Proceedings of the Society for Information Display, Volume 17, 1976, include a discussion of screening algorithm called the Floyd and Steinberg error diffusion algorithm; Billotet-Hoffman and Bryngdahl in the Proceedings of the Society for Information Display, Volume 24, 1983, discuss modifications to the Floyd-Steinberg algorithm which include a varying threshold, a dither, instead of a fixed threshold; and U.S. Pat. No. 5,045,952 to Eschbach entitled METHOD FOR EDGE ENHANCED ERROR DIFFUSION; U.S. Pat. No. 5,208,871 to Eschbach entitled PIXEL QUANTIZATION WITH ADAPTIVE ERROR DIFFUSION; U.S. Pat. No. 5,226,096 to Fan entitled DIGITAL HALFTONING WITH SELECTIVELY APPLIED DOT-TO-DOT ERROR DIFFUSION; U.S. Pat. No. 5,321,525 to Hanes entitled CLUSTERED HALFTONING WITH DOT-TO-DOT ERROR DIFFUSION and U.S. Pat. No. 5,268,774 to Eschbach entitled HALFTONING WITH ENHANCED DYNAMIC RANGE AND EDGE ENHANCED ERROR DIFFUSION, all of which are totally incorporated herein by reference, describe various embodiments of error diffusion (ED).

In some instances, there are side effects associated with processing a gray halftone image through conventional threshold processing methods or error diffusion (ED). For example, simple, uniform (same threshold applied everywhere) thresholding can remove intermediate gray levels and, therefore, can introduce an unacceptably large gray error. In rehalftoning, frequency components of the new halftone screen can combine undesirably with a halftone grid pattern of the original or scanned image to produce objectionable moiré patterns. Conventional error diffusion (ED) can usually render a scanned halftone without pattern artifacts. However, conventional error diffusion (ED) techniques often produce images with excessive fragmentation of dots. In at least some environments, such as, for example, some xerographic environments, dot or spot fragmentation is to be avoided. Compact halftone dots are more forgiving of non-linearities and process drifts associated with reprographic devices than are tiny dot fragments associated with a diffuse fragmentary halftone dot. For example, a small dimensional offset in the size of a tiny dot fragment represents a larger dot gain error than does the same dimensional offset applied to a large compact dot. Dot gain errors are perceived as errors in the lightness or darkness of an image or portions of an image.

Rank ordered error diffusion (ROED) is a form of error diffusion that strives to produce compact dots. U.S. Patent Application Publication No. U.S. 2003/0090729 A1 by Loce, et al., filed Oct. 1, 2001 and published on May 15, 2003 entitled RANK ORDER ERROR DIFFUSION IMAGE PROCESSING, the disclosure of which is totally incorporated herein by reference, explains that in rank ordered error diffusion, error is distributed to pixels neighboring a pixel of interest (or target pixel) based on a ranking of the neighboring pixels. The ranking is based on pixel values of the neighboring pixels. Optionally, a spatial weighting is applied to the pixel values before ranking to provide a preference for pixels closest to the target pixel or to a particular portion of a related halftone screen.

While rank ordered error diffusion (ROED) improves dot clustering, in some circumstances, images produced through ROED may be perceived to include objectionable moiré. As indicated above, standard or non-rank ordered error diffusion (ED) techniques tend to produce images that are perceived to be moiré free.

Therefore, there is a desire for an image halftoning algorithm that provides the best compromise between the moiré resistance of ED and the low noise or dot clustering of ROED.

Increasing image resolution is another mechanism for improving rendered image quality. Recently, techniques have been developed for controlling the marking process of marking engines at subpixel resolutions, at least in a cross-process direction. Such subdivided pixels are said to have high addressability or to be high addressable. Pixel quantization processes have been adapted to take advantage of high addressability. Whereas standard pixels are associated with a binary quantization (0 or 1, mark or no mark), high addressable pixels are associated with a multi-level quantization. For example, where a pixel can be subdivided into four subpixels, a contone value of a pixel may be quantized to one of five quantization levels (e.g., 0, 1, 2, 3 and 4, associated with contone values of, for example, 0, 64, 128, 192 and 255). The selected quantization level identifies how many of the subpixels are to be marked.

U.S. Pat. No. 5,325,216 to AuYeung entitled RASTER OUTPUT SCANNER WITH SUBPIXEL ADDRESSABILITY; U.S. Pat. No. 6,301,397 B1 to Jankowski, et al. entitled SYSTEMS AND METHODS FOR ROTATING HIGH ADDRESSABILITY IMAGES and U.S. Pat. No. 6,449,396 B1 to Loce, et al. entitled COMPACT RENDERING BINARY HIGH ADDRESSABILITY IMAGES, the disclosures of which are totally incorporated herein by reference, disclose aspects of high addressability processing. U.S. Pat. No. 5,374,997 to Eschbach entitled HIGH ADDRESSABILITY ERROR DIFFUSION WITH MINIMUM MARK SIZE; U.S. Pat. No. 5,528,384 to Metcalfe, et al. entitled SYSTEM AND METHOD FOR IMPLEMENTING FAST HIGH ADDRESSABILTY ERROR DIFFUSION PROCESS; U.S. Pat. No. 5,608,821 to Metcalfe, et al. entitled METHOD OF HIGH ADDRESSABILITY ERROR DIFFUSION; U.S. Pat. No. 6,351,319 B1 to Schweid, et al. entitled SYSTEM AND APPARATUS FOR SINGLE SUBPIXEL ELIMINATION WITH LOCAL ERROR COMPENSATION IN A HIGH ADDRESSABLE ERROR DIFFUSION PROCESS and U.S. Pat. No. 6,353,687 B1 to Schweid also entitled SYSTEM AND APPARATUS FOR SINGLE SUBPIXEL ELIMINATION WITH LOCAL ERROR COMPENSATION IN A HIGH ADDRESSABLE ERROR DIFFUSION PROCESS, the disclosures of which are totally incorporated herein by reference, discuss high addressability in the context of error diffusion. U.S. Pat. No. 5,504,462 attributed to Clanciosi (a misspelling of Cianciosi), et al. entitled APPARATUS FOR ENHANCING PIXEL ADDRESSABILITY IN A PULSE WIDTH AND POSITION MODULATED SYSTEM and U.S. Pat. No. 6,184,916 B1 to Cianciosi entitled MULTIPLE-PULSE, PULSE WIDTH AND POSITOIN MODULATION SYSTEMS AND METHODS, the disclosures of which are totally incorporated herein by reference discuss high addressability in terms of pulse width and positioned modulation implementations.

Taking advantage of an availability of high addressability can improve rendered image quality. However, taking advantage of high addressability also increases demands on image processing resources and consumes communication bandwidth.

Therefore, there has been a desire for systems and methods that can take advantage of high addressability when it would be most beneficial and select low addressability or standard binary pixel processing in portions of an image where increased resolution would be of little benefit. Furthermore, there has been a desire to combine the benefits of such adaptive quantization with benefits of a halftoning algorithm that provided the best compromise between the moiré resistance of ED and the low noise or dot clustering of ROED.

BRIEF DESCRIPTION

Aspects of the present disclosure in embodiments thereof include systems and methods for halftoning an image.

For instance, some embodiments include a method for halftoning an image that includes selecting a target pixel from the image quantizing the target pixel determining a quantization error value based on the quantization of the target pixel and distributing error to pixels neighboring the target pixel according to a blended combination of at least two error diffusion techniques.

For example, distributing error to pixels neighboring the target pixel can include selecting an error distribution mask for identifying pixels neighboring target pixels as potential recipients of distributed error, selecting ranking offsets in association with pixel locations in the error distribution mask selecting diffusion coefficients in association with pixel locations in the error distribution mask, selecting a blending factor value and distributing error to pixels neighboring the target pixel according to the distribution mask, ranking offsets, diffusion coefficients, blending factor and error value.

Distributing error to pixels neighboring the target pixel can include ranking the neighboring pixels for receiving error according to a blended combination of a value of each respective neighboring pixel and the ranking offset of the respective pixel position of each neighboring pixel, wherein a contribution of the pixel value and a contribution of the ranking offset to the blended combination are functions of the blending factor value, and distributing error to the respective neighboring pixels according to the ranking.

In some embodiments distributing error to the respective neighboring pixels according to the ranking includes distributing error to the respective neighboring pixels according to the ranking and a blended combination of an ED term and an ROED term for each respective neighboring pixel.

For instance, the ED term can be a product of the determined error value and the respective distribution coefficient associated with the respective mask position of the respective neighboring pixel. The ROED term can be remaining error to be distributed according to the ranking, wherein a contribution of the ED term and a contribution of the ROED term to the blended combination are functions of the blending factor value.

Quantizing the target pixel can include quantizing the target pixel to one of two binary values according to a single threshold, or quantizing the target pixel to one of at least three high addressable quantization values according to at least two high addressable quantization thresholds. For example the quantization resolution can be selected based on a relative position of the target pixel to a halftone structure or edge. The relative position of the target pixel can be determined from a value of the target pixel and or values of pixels neighboring the target pixel. Alternatively the relative position of the target pixel can be determined from a tag or meta-data associated with the pixel.

One class of methods for halftoning an image does not necessarily include halftoning in accord with a blended combination of two error diffusion techniques. Those methods include selecting a target pixel from the image, selecting a quantization resolution for the target pixel from a plurality of possible quantization resolutions based on a contone value of the target pixel and/or based on contone values of pixels neighboring the target pixel, quantizing the pixel value of the target pixel according to the selected quantization resolution and halftoning the selected target pixel through an error diffusion process in accord with the quantization.

An imaging system can include an image processor that is operative to receive an image, select a target pixel from the image, quantize the target pixel, determine a quantization error value based on the quantization of the target pixel and distribute error to pixels neighboring the target pixel according to a blended combination of at least two error diffusion techniques.

The imaging system may also include a configuration module that is operative to select an error distribution mask for identifying pixels of an image, neighboring target pixels of the image, as potential recipients of distributed error, determine ranking offsets in association with pixel locations in the error distribution mask, determine diffusion coefficients in association with pixel locations in the error distribution mask and determine a blending factor value for controlling a degree of blending of two error diffusion techniques, wherein the image processor is operative to distribute error to pixels neighboring the target pixel according to the distribution mask, ranking offsets, diffusion coefficients, blending factor and error value. The image processor can use those determined values to halftone an image as described above.

BRIEF DESCRIPTION OF THE DRAWINGS

FIG. 4 is a flowchart outlining a method for distributing error that is applicable to the method of FIG. 1.

FIG. 5 is a diagram showing second and third diffusion maps in reference to a target pixel as well as illustrative parameters associated with illustrative embodiments of the method of FIG. 1.

FIG. 6 is a diagram showing fourth and fifth diffusion maps in reference to a target pixel as well as illustrative parameters and expressions associated with embodiments of the method of FIG. 1.

DETAILED DESCRIPTION

Figure 1:
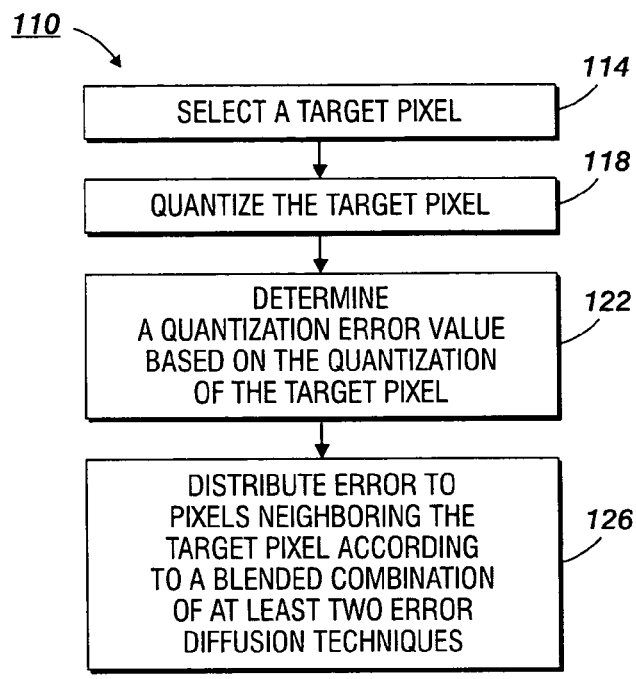
FIG. 1 is a flowchart outlining a method for halftoning an image.

Referring to FIG. 1, a method for halftoning an image can include selecting 114 a target pixel, quantizing 118 the target pixel, determining 122 a quantization error value based on the quantization of the target pixel and distributing 126 error to pixels neighboring the target pixel according to a blended combination of at least two error diffusion techniques.

Selecting 114 the target pixel can include receiving an image that is to be rendered and processing the image one pixel at a time. For example, a processing path is selected from a set of space-filling curves, such as, a simple raster scan, including, for example, the common repeating left to right or side to side scan, which typically begins at the top of an image and progressively scans a line from a first side to a second side and then drops to the next line and scans that line in the same first side to second side manner. Additionally, the set of space filling curves may include more complicated scanning paths that follow, for example, serpentine raster scans, Hilbert or Peano curves or other fractal-type patterns.

Quantizing 118 the target pixel can include quantizing the pixel according to a simple binary or two-level quantization or can include applying a high-addressable or multi-level quantization. In binary quantization, a contone value of a pixel, for example, a gray or lightness level of one separation or component color of a multi-color pixel, is compared to a threshold value. The threshold can be the same for every pixel in the image or determined on a pixel-by-pixel basis. For instance, the threshold may be associated with a halftone screen. Contone values above the threshold are quantized to a first binary state, and contone or gray level values below the threshold are quantized to a second binary state. Contone values that are equal to the threshold can be quantized to the first or second binary state depending on implementation. Ultimately, pixels associated with one of the first binary state or the second binary state will be associated with marks placed on print media. Pixels associated with the other binary state will be associated with unmarked portions of the print media.

Quantizing 118 according to high addressability operates in a similar manner. However, in the case of high-addressable quantization 118, contone or gray level values are compared to a plurality of thresholds. For example, as indicated above, where a contone value of a pixel may range from 0 to 255 and wherein a system can divide a pixel into four subpixels associated with five quantization levels (e.g., 0-4), high-addressable quantization 118 may be based on four threshold values (e.g., 32, 96, 160 and 224). Again, the threshold values may be fixed for all the pixels in a particular image. Alternatively, the thresholds may be varied on a pixel-by-pixel basis. For instance, the thresholds may be associated with a halftone screen. Ultimately, high-addressable quantization determines a number, proportion, fraction or percentage of subpixels which are marked or unmarked in association with a given pixel. For instance, a highest (or lowest) threshold exceeded (or crossed), by the contone value of the pixel being quantized, is the threshold used for quantization 118. For example, given the high-addressable thresholds listed above, a contone or gray level of 102 exceeds the second threshold (96). Therefore, the contone value may be considered to be quantized to a value of 2 indicating that, for example, two subpixels are to be marked, or where high addressability is achieved through pulse width and/or position modulation, that about 50% of the pixel is to be marked.

Quantizing 118 the target pixel can also include determining whether to use a binary or a high-addressable quantization technique. For example, high addressability is beneficially applied in gray or intermediate portions of an image. If a pixel is to be fully marked or fully unmarked, the extra communication bandwidth or processing overhead associated with storing, communicating and rendering high-addressable pixels is wasted. Therefore, high-addressable quantization is beneficially applied where contone values of a pixel are in an intermediate range. In order to support compaction, high addressability is beneficially applied when a target pixel is near an edge of a halftone structure, such as, a halftone dot, hole or a halftone line of an associated halftone dot or line screen. Therefore, referring to FIG. 2, quantizing 118 the target pixel can include determining 210 a relative position of a target pixel with respect to a halftone structure and selecting a quantization level based on the determined 210 relative position. For example, binary quantization might be used 214 to quantize 118 the target pixel, if the target pixel is near a center of a halftone structure (e.g., a dot, hole or line). High-addressable quantization might be used 218 if the target pixel is determined 210 to be spaced away from the center of a halftone structure or near an edge of the halftone structure.

For instance, the relative position of the target pixel can be determined 210 by evaluating a contone or gray level value of the target pixel. For instance, nearly saturated contone values (e.g., contone values equal to or below a quantization resolution selection threshold or equal to or above a high-quantization resolution selection threshold) may be assumed to indicate that the target pixel is near a center of a halftone structure or spaced well away from a halftone structure, well inside an unmarked area or "hole". As indicated above, it might be appropriate to use 214 or select binary quantization for such target pixels. This could mean that the pixel is near the center of a halftone dot, or in a region that is very dark, such a section of image where the dots have a high degree of overlap, and this pixel is not near the edge of a hole. Either way, the thresholds indicate that the pixel is not substantially on the edge of a dot or hole. Note that a dark dot is the more obvious structure for light colors and a white hole is the obvious halftone structure for dark colors. When a pixel has a contone value that is above the low-quantization resolution selection threshold and below the high-quantization resolution selection threshold, it may indicate that the target pixel is spaced away from the center of the halftone structure or is near an edge of the halftone structure.

When the relative position of a target pixel is determined 210 to be spaced away from the center of the halftone structure or near an edge of a halftone structure, it may be appropriate to use 218 or select a high-addressable quantization resolution. Furthermore, the high-addressable quantization resolution selected may be a function of target pixel position. For instance, a first high-addressable quantization resolution (e.g., three levels, 0-2) may be selected for target pixels determined 210 to be within a first distance of the halftone structure center and a second high-addressable quantization resolution (e.g., five levels, 0-4) may be selected for target pixels determined 210 to be at a second distance from the center of the halftone structure. Furthermore, additional and/or other high-addressable quantization levels may be used 218 when the target pixel is determined 210 to be within these or other ranges of distances from the halftone structure center.

The relative position of the target pixel can be determined 210 by additional or other methods. For instance, pixel values of pixels neighboring the target pixel can be determined and analyzed. The analysis of pixel values within a window (e.g., 3×3, 5×5) around the target pixel can indicate whether the target pixel is near an edge or well within a halftone structure. For instance, if all of the neighboring pixels have contone values similar to that of the target pixel, it may indicate that the target pixel is located well within or spaced well away from a halftone structure and that using 214 binary quantization (or other relatively low resolution quantization) is appropriate. On the other hand, if some of the neighboring pixels have contone values associated with relative darkness while other of the neighboring pixels are associated with relative lightness, it may indicate that the target pixel is located near an edge or halftone structure boundary and that using 218 a high-addressable quantization resolution is appropriate. As will be discussed in greater detail below, an analysis of neighboring pixels may also be useful in determining appropriate spatial quantization, or a determination as to which of a plurality of high-addressable subpixels should be selected to marked or unmarked. For example, those subpixels closer to the neighboring pixels having the relative darkness might be selected to be marked in accord with the high-addressable quantization 118, 218.

Alternatively, the target pixel may be associated with meta-data or a tag, provided by an image source that indicates a relative position of the target pixel. Therefore, the relative position of the target pixel can be determined 210 by examining the meta-data or tag.

Determining 122 the quantization error is based on a comparison of the operating quantizing threshold to the contone value being quantized. For example, a typical binary quantizing threshold value is 128 (in 8-bit systems). Alternatively, a dither matrix or halftone screen can be selected to provide a threshold for a pixel based on a location of the pixel within the image. A threshold value is then selected from the dither matrix or halftone screen based on the location of the target pixel. Additionally, while error diffusion (ED) and rank-ordered error diffusion (ROED) (which will be discussed in greater detail below) are often described in terms of modifying pixel values. It is considered equivalent or nearly equivalent to instead modify threshold values of thresholds that are related to pixels within a diffusion mask. For example, where ED or ROED are described in terms of adding an error-related value to a pixel value of a particular pixel, it is equivalent, or nearly equivalent, to subtract the error-related value from a threshold associated with the pixel.

However the threshold is determined, during binary quantization 118, 214 the value of the target pixel is compared to the quantizing threshold and a marking decision is made. For example, a decision is made to place a mark or not place a mark. For instance, not placing a mark is associated with a contone value of 0 and (in binary quantization) placing a mark is associated with a contone value of 255. Determining 122 the quantization error is based on a comparison of the contone value associated with the marking decision and the contone value of the quantized pixel. For example, if the quantization threshold is 128 and the contone value of the target pixel is 200, then the marking decision would be to place a mark. A mark is related to a contone value of 255. Therefore, the mark would be 55 counts too dark, and there would be a darkness (or lightness) error of 55. That is, subtracting the value related to the marking decision (255) from the contone pixel value (200) leads to a calculated or determined 122 quantization error value of −55. It is this quantization error value that would be diffused or distributed 126 to pixels neighboring the target pixel.

Determining 122 the quantization error in the case of high-addressable quantization 118, 218 proceeds in a similar manner. In the case of the five-level quantization resolution associated with the four values described above (0, 64, 128, 192 and 255), it would be determined that the illustrative contone pixel value of 200 is greater than associate threshold values of, for example, 32, 96 and 160, but less than a threshold value of 224. Therefore, a marking decision would be made to place marks in three out of four subpixels. For example, placing marks in 3 out of 4 subpixels is associated with a contone value of about 192. Therefore, the three subpixel marks would be about 8 counts too light, and there is a lightness (or darkness) error of 8. That is, subtracting the value related to the marking decision (about 192) from the contone pixel value (200) leads to a calculated error value of about 8. This would be the quantization error determined 122 to be distributed 126 to pixels neighboring the target pixel.

Distributing 126 error to pixels neighboring the target pixel according to a blended combination of at least two error diffusion techniques, can include diffusing error according to a blended combination of a standard error diffusion technique (ED) and a rank-ordered error diffusion (ROED) technique.

Figure 3:
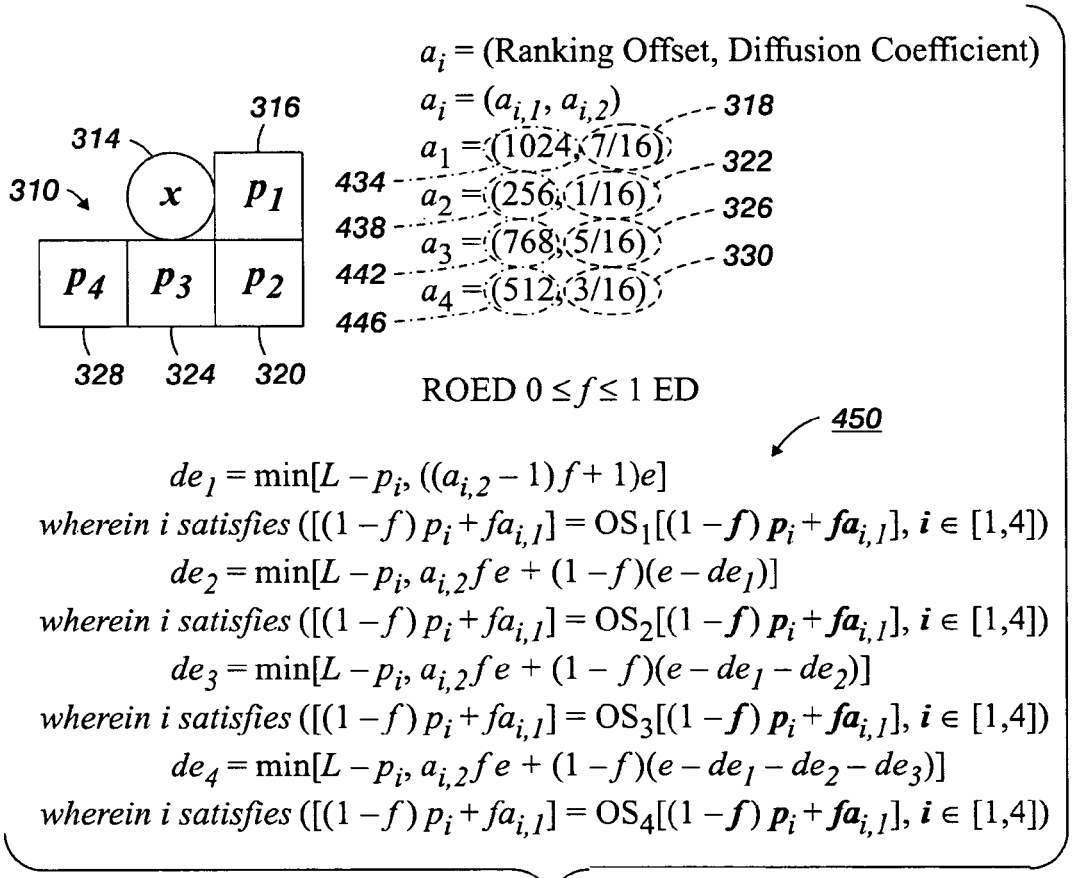
FIG. 3 is a diagram showing a first diffusion map in reference to a target pixel as well as illustrative parameters and expressions associated with illustrative embodiments of the method of FIG. 1.

Referring to FIG. 3 and FIG. 4, both standard (ED) and rank-ordered error diffusion (ROED) techniques involve selecting 414 an error diffusion or distribution mask (e.g., 310) for identifying pixels neighboring a target pixel (e.g., 314). In ED, each neighboring pixel position in the error diffusion or distribution mask 310 is associated with a diffusion coefficient. For example, a first pixel position 316 may be associated with a first diffusion coefficient 318, a second pixel position 320 may be associated with a second diffusion coefficient 322, a third pixel position 324 may be associated with a third diffusion coefficient 326 and a fourth pixel position 328 may be associated with a fourth diffusion coefficient 330. In operation, the determined 122 quantization error (for example, the −55 or 8 contone counts discussed above) is distributed to the neighboring pixels identified by the diffusion mask 310 according to the diffusion coefficients (318, 322, 326, 336). For example, where a first diffusion coefficient (e.g., 318) has a value of $7/16$, $7/16$ of the determined 122 quantization error would be added (or subtracted) to (or from) the associated contone value of the first neighboring pixel (e.g., 316). Likewise, where the second (e.g., 322) diffusion coefficient has a value of 1/16, the third diffusion coefficient (e.g., 326) has a value of 5/16, and the fourth (e.g., 330) diffusion coefficient has a value of 3/16, the second 320, third 324 and fourth 328 pixel positions in the diffusion mask 310 receive 1/6, 5/16 and 3/16 of the determined 322 quantization error, respectively.

Some embodiments include variations on this procedure. For instance, in some embodiments, when distributing all the error allocated to a pixel position would drive the respective contone value of the pixel beyond some limit (e.g., less than 0 or more than 255), the amount of error distributed to that pixel is limited to the amount that places the neighboring pixel at saturation and any remaining error is discarded or is reallocated to remaining pixels in the mask (e.g., 310).

As indicated above, image presentations resulting from ED procedures are often moiré free. However, in some instances, these images are perceived to be noisy or grainy in appearance.

In ROED, diffusing error to neighboring pixels within a diffusion mask (e.g., 310) includes sorting or ranking the neighboring pixels (within the selected diffusion mask) according to pixel values of the neighboring pixels and distributing the quantization error (or a value that is a function of the quantization error) to at least one of the neighboring pixels based on the pixels position within the sorting or ranking. For example, if the error is positive, then error is transferred to the highest valued neighboring pixel that has not yet received an error distribution from the current target pixel. The error is transferred up to a maximum value. For example, in a system where an 8-bit value is used to represent gray levels ranging from 0 to 255, 255 may be a maximum value allowed for a pixel. In such a system, where, for example, a quantization error value is 100, and the first ranked pixel, or pixel with the highest value, has a pixel value of 220, 35 counts of the quantization error value are transferred to the first ranked pixel and the quantization error value is reduced by 35 counts. At the end of this operation, the remaining quantization error value is 65 (100–35) and the pixel value of the first ranked neighboring pixel is raised to the maximum value of 255. Since there is remaining error (65), processing continues to the next ranked pixel in the diffusion mask. Processing ends when there are no more pixels available to receive error in the diffusion mask or when all of the error has been distributed.

If the error is negative, then error is transferred to the lowest valued neighboring pixel that has not yet received an error distribution from the current target pixel. The error transferred up to a minimum pixel value. In other words, when the quantization error is negative, pixels are ranked from lowest value to highest. For example, in the 8-bit system described above, 0 may be a minimum value allowed for a pixel. In such a system, where a quantization error is determined to be, for example, –100, and the first ranked pixel or pixel with the lowest value has a contone value of 20, –20 counts of the quantization error value are transferred to the lowest valued neighboring pixel. At the end of that operation, –80 counts of quantization error remain to be distributed, and the pixel value of the lowest valued neighboring pixel is lowered to the minimum value of 0. Since quantization error remains, the process is repeated with the next ranked pixel or pixel with the next lowest contone value. Again, processing continues until all the neighboring pixels in the diffusion mask have received error or until all the error has been distributed.

Variations on this general form of ROED include distributing error only to the first ranked pixel and either discarding error which would drive the pixel value beyond some limit or distributing the error to the pixel without regard to a pixel value limit. Other variations are known. However, as used herein, ROED refers to the forms described above.

As indicated above, processing an image according to embodiments of ROED yields images with tightly clustered dots or halftone structures that are perceived as less grainy or noisy than are images rendered through ED. However, sometimes, images rendered through ROED are susceptible to perceptible moiré. For a given image, improved image quality can be achieved by determining an acceptable tradeoff between the characteristics of ED and ROED by providing for image processing according to a blending between ED and ROED image processing techniques.

Distributing 126 quantization error to pixels neighboring the target pixel according to a blended combination of at least two error diffusion techniques can include selecting 414 an error distribution mask, selecting 418 ranking offsets in association with pixel locations in the error distribution mask, selecting 422 diffusion coefficients in association with pixel locations in the error distribution mask, selecting 426 a blending factor and distributing 430 error to pixels neighboring the target pixel according to the distribution mask, ranking offsets, diffusion coefficients, blending factor and the determined 122 quantization error value.

Selecting 414 an error diffusion mask can be based on convenience or on a desired rendering affect. For example, relatively small distribution masks (e.g., 310) promote dot or halftone structure compactness. However, larger diffusion masks (e.g., see FIG. 5 and FIG. 6) can have advantages as well. For instance, a larger mask may have improved compatibility with a low-frequency halftone screen of an input image. Additionally, diffusion mask selection 414 can be a function of a selected processing path. The order in which pixels are processed can have an effect on processing artifacts that are apparent in a rendered image. Processing paths are sometimes chosen to minimize these artifacts based on the content of an image or characteristics of a rendering device. It is often desirable that pixels that receive error be unprocessed pixels. Therefore, a diffusion mask is usually selected to encompass only pixels that are yet to be processed. The space-filling curve selected as the processing path can, therefore, be a factor in diffusion mask selection 414. As indicated above, in ED, error is distributed according to diffusion coefficients (e.g., 318, 322, 326, 330).

The concept of ranking neighboring pixels is foreign to standard ED. However, where image processing is to include a distribution 430 of error according to a blend between ED and ROED, it can be useful to make provision for driving the blending process according to a ranking order that is implied by the diffusion coefficients (e.g., 318, 322, 326, 330) associated with the selected ED process. For example, with reference to FIG. 3, selecting 418 ranking offsets can included selecting first 434, second 438, third 442 and fourth 446 ED ranking offsets. For instance, the ranking offsets (e.g., 434, 438, 442 and 446) are selected so that the neighboring pixel with the highest diffusion coefficient tends to receive error first (in a ranking) and the neighboring pixel with the lowest diffusion coefficient tends to receive error last (in the ranking).

Diffusion coefficient selection 422 may be based on some processing goal, such as, for example, dot compaction and/or artifact minimization.

Selecting a blending factor is based on a judgment as to how much influence each diffusion technique should have in a rendered image. Blending factor selection 426 may be based on imaging system operator experience, trial and error, or an analysis of aspects of the input image and rendering device.

Distributing 430 error to pixels neighboring the target pixel according to the distribution mask, ranking offsets, diffusion coefficients, blending factor and quantization error value can occur in accord with ranking and error distribution functions. For example, ranking the neighboring pixels and distributing the error can be done according the expression:

$$de_n = \min\left[L - p_i, a_{i,2}fe + (1-f)\left(e - \sum_{j=0}^{n-1} de_j\right)\right]; de_0 = 0$$

where $i$ satisfies $([(1-f)p_i + fa_{i,1}] = OS_n[(1-f)p_i + fa_{i,1}], i \in [1, m])$ wherein $OS_n$ is a value of the blended combination of the $n^{th}$ ranked respective neighboring pixel and the ranking offset of the $n^{th}$ ranked respective pixel position, where i is the pixel index within the diffusion mask (e.g., 310) of the pixel of $n^{th}$ ranked blended value, f is the blending factor and is selected to have a value in the range of 0 to 1, $p_i$ is a contone value of the $i^{th}$ pixel in the error distribution mask, $a_{i,1}$ is the ranking offset of the $i^{th}$ pixel in the error distribution mask, e is the quantization error, $de_n$ is the error distributed to the $n^{th}$ ranked neighboring pixel, $a_{i,2}$ is the diffusion coefficient of the $i^{th}$ pixel in the error distribution mask, j is an index ranging in value from 0 to n−1, m is a number of participating pixel locations within the error diffusion mask and L is a selected maximum contone pixel value limit.

As indicated above, f is a blending factor that has a value ranging from 0 to 1. In the illustrated embodiments, a blending factor value of 0 requests image processing according to pure ROED. A blending factor value f of 1 calls for image processing according to pure ED. Values of f between 0 and 1 call for image processing according to a blended combination of ROED and ED wherein the value of f controls an influence each kind of image processing technique has over the final output.

For example, with continued reference to FIG. 3, OS may be considered an order statistic or function that evaluates blended combinations of values associated with each position (e.g., 316, 320, 324, 328) in an error diffusion mask (e.g., 310), determines a ranking for each position in the mask and returns a value of the $n^{th}$ ranked pixel position. For example, $OS_1$ returns a blended value based on a contone pixel value ($p_i$) and a ranking offset (e.g., $a_{i,1}$) of the first ranked diffusion mask pixel position. In other words, $OS_1$ identifies the pixel position (i) of the first ranked or ordered pixel position within the diffusion mask. $OS_2$ identifies the second ranked or ordered diffusion mask pixel position and $OS_n$ identifies the $n^{th}$ ranked or ordered diffusion mask pixel position for a given target pixel.

If the blending factor f is set to a value of 0, then, as can be seen in the illustrated ranking function 450 of FIG. 3, the coefficient on the ranking offset $a_{i,1}$ is 0, and that term has no influence on the ranking. Instead, the ranking is entirely based on values of pixels ($p_i$) in the diffusion mask (e.g., 310). If instead, the value of the blending factor f is 1, the coefficient on the pixel value $p_i$ is 0 and that term has no influence on the ranking. Instead, the pixel positions in the diffusion mask (e.g., 310) are ranked based only on the ranking offsets (e.g., $a_{i,1}$) associated therewith. If the blending factor f has a value between 0 and 1, then the ranking or order statistic is based on a combination of the value of the pixels ($p_i$) and the ranking offsets ($a_{i,1}$) and their respective coefficients (e.g. (1−f), f). In this way, $OS_n$ selects the value of the pixel index i for the $n^{th}$ ranked neighboring pixel.

As indicated above, the amount of error distributed to the $n^{th}$ ranked pixel can be a blended function of the amount of error that would be distributed under ED and the amount of error that would be distributed under ROED. For example, if the blending factor f is 0, then the amount of error distributed to the first ranked neighboring pixel (i.e., $de_1$) can be the smaller value of all of the quantization error e (the ROED term) and the difference between a selected maximum contone pixel value limit (L) and the related contone value of the first pixel. If the blending factor f has a value of 1, then the amount of error distributed to the first ranked pixel ($de_1$) can be the lesser of an ED term, e.g., the quantization error e multiplied by the diffusion coefficient (e.g., $a_{i,2}$) of the first ranked diffusion masked pixel position, or the difference between the first ranked pixel value and the pixel value limit (L). If the blending factor f has a value between the 0 and 1, then the amount of error distributed to the first ranked pixel position is selected from between the difference between the pixel value and the limit (L) and a blended value generated from the error the ROED term and the ED term, e.g., the error multiplied by the diffusion coefficient ($a_{i,2}$) and their respective blending coefficients (e.g., (1−f), f). The error distributed to the remaining pixels in the mask is determined in a similar manner. However, instead of being based on the determined 122 quantization error (e), the calculations of the amount of error to be distributed to the remaining neighboring pixels is based on error remaining to be distributed (i.e., the residual error). In other words, for example, error to be distributed to the second ranked or ordered distribution mask pixel position is determined based on the determined 122 quantization error (e) less the error distributed to the first ranked or ordered pixel position (i.e., $de_1$). In these cases, the remaining error can be considered the ROED term and the remaining error multiplied by the appropriate diffusion coefficient can be considered the ED term.

As indicated above, in some embodiments, error distributed to pixels is not limited by some selected maximum contone pixel value (e.g., L). In those embodiments, error can be distributed 126, 430 according to expressions similar to:

$$de_n = a_{i,2}fe + (1-f)\left(e - \sum_{j=0}^{n-1} de_j\right); de_0 = 0.$$

Referring to FIG. 5, in some embodiments, distributing 126, 430 error according to a blended combination of at least two error diffusion techniques includes selecting 414 an error diffusion mask from a blended combination of a mask 510 desirable for a first form of error diffusion (e.g., ROED) and a second mask 514 (that is a subset of the first mask) that might be desirable for the second form of error diffusion (e.g., ED). For example, by selecting 418 ranking offsets and selecting 422 diffusion coefficients having values of 0 for pixel positions only in the larger diffusion mask 510 and selecting diffusion coefficients 518 that total to 1 for pixel positions of the smaller diffusion mask 514, one is able to provide for blending between the larger diffusion mask 510 and the smaller diffusion mask 514 according to the value of the lending factor f.

Referring to FIG. 6, it is also possible to provide for blending between a small mask (e.g., 610) used for pure ROED and a larger mask (e.g., 614) used for blended ED and ROED. In such embodiments, selecting 418 ranking offsets includes selecting ED ranking offsets (e.g., 618) and ROED ranking offsets (e.g., 622), setting selected ones of the ROED ranking offsets (e.g., 622) to 0, and ranking the neighboring pixels and distributing the error according to an expression similar to:

$$de_n = \min\left[L - p_i, a_{i,3}fe + (1-f)\left(e - \sum_{j=0}^{n-1} de_j\right)\right]; de_0 = 0$$

where $i$ satisfies $$([(1-f)(p_i + a_{i,2}) + fa_{i,1}] = OS_n[(1-f)(p_i + a_{i,2})fa_{i,1}], i \in [1, m])$$

wherein $OS_n$ is a value of the blended combination of the $n^{th}$ ranked respective neighboring pixel and the ranking offset of the $n^{th}$ ranked respective pixel position, where i is the pixel index within the diffusion mask of pixel of $n^{th}$ ranked blended value, f is the blending factor and is selected to have a value in the range of 0 to 1, $p_i$ is a contone value of the $i^{th}$ pixel in the error distribution mask, $a_{i,1}$ is the ED ranking offset of the $i^{th}$ pixel in the error distribution mask, $a_{i,2}$ is the ROED ranking offset of the $i^{th}$ pixel in the error distribution mask, e is the quantization error, $de_n$ is the error distributed to the $n^{th}$ ranked neighboring pixel, $a_{i,3}$ is the diffusion coefficient of the $i^{th}$ pixel in the error distribution mask, j is an index ranging in value from 0 to n−1, m is a number of participating pixel locations within the error diffusion mask and L is a selected maximum contone pixel value limit.

In such embodiments, if the blending factor f is equal to 0, calling for pure ROED, ranking is based on the ROED term, i.e., the ROED ranking offset (e.g., $a_{i,2}$) and the value of the pixels ($p_i$). By selecting 418 extreme values (e.g., 256) as ranking offsets for pixel positions in the smaller mask 610 and selecting 418 ROED ranking offset values of 0 for pixel positions outside the smaller mask 610, the order statistic or function $OS_n$ is forced to give high ranks to the pixel positions within the smaller mask 610.

An alternative or complement to the ROED ranking offset based embodiment described above is to establish a processing rule wherein, for example, only pixel positions $p_1$, $p_4$, $p_5$ and $p_6$ are used when pure ROED is requested (e.g., f equals 0) and allow the entire mask (e.g., 614) to be used under all other circumstances.

In other alternatives, the selected maximum contone pixel value limit L may be a function of the value of the blending factor. For example, when the blending factor f has a value requesting pure or nearly pure ROED, L can be raised to ensure that all error is distributed to the pixels of the smaller mask 610.

Figure 7:
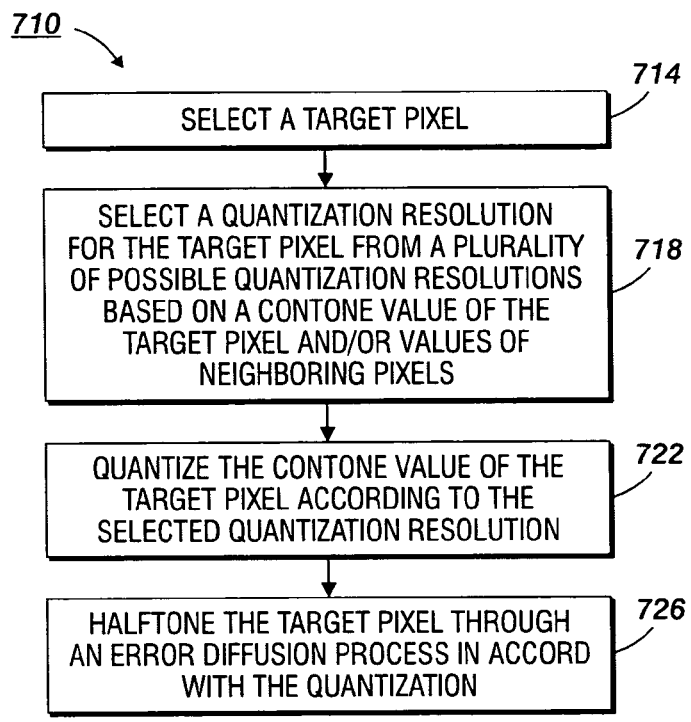
FIG. 7 is a flowchart outlining a method for halftoning an image.

Adaptive quantization (e.g., FIG. 2) has been described as an optional component of the method 110 for halftoning an image. However, it is to be understood that adaptive quantization can be used independently. For example, referring to FIG. 7, a method 710 for halftoning an image can include selecting 714 a target pixel, selecting 718 a quantization resolution for the target pixel from a plurality of possible quantization resolutions based on a contone value of the target pixel and/or values of neighboring pixels, quantizing 722 the contone value of the target pixel according to the selected quantization resolution and halftoning 726 the target pixel through an error diffusion process in accord with the quantization.

For instance, selecting 714 a target pixel may proceed in a manner similar to that described above with reference to the method 110 for halftoning an image (e.g., 114).

Figure 2:
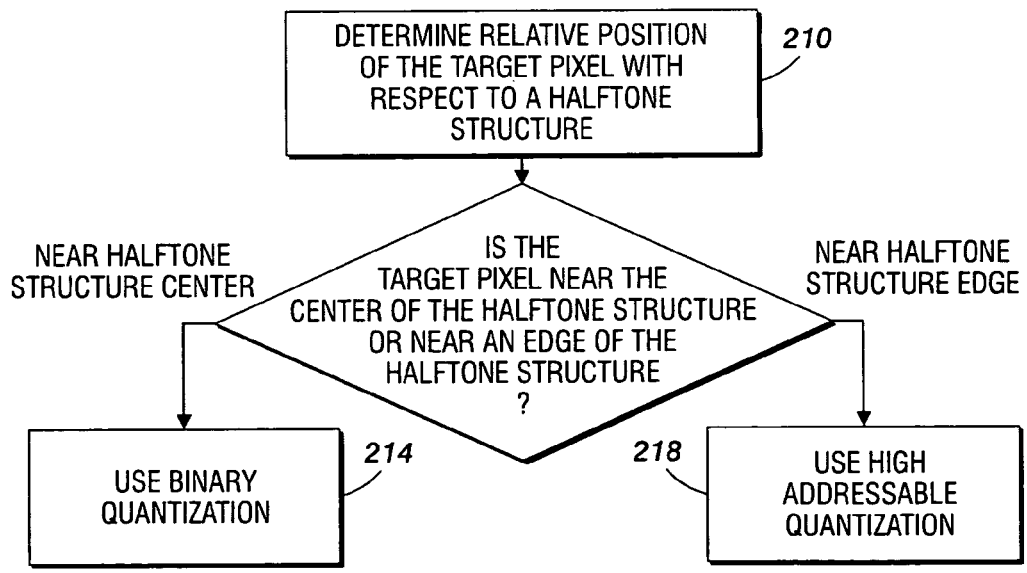
FIG. 2 is a flowchart outlining a method for selecting a quantization resolution for a target pixel that is applicable to the method of FIG. 1.

Selecting 718 the quantization resolution may be similar to the process described with reference to FIG. 2. For example, selecting a quantization resolution may include selecting a binary quantization resolution if the contone value of the target pixel, and/or contone values of selected neighboring pixels, are equal to or below a low quantization resolution selection threshold or equal to or above a high quantization resolution selection threshold. Additionally, or alternatively, selecting 718 the quantization resolution can include selecting a high-addressable quantization resolution if the contone value of the target pixel and/or contone values of selected neighboring pixels are above the low quantization resolution selection threshold and below the high quantization resolution selection threshold.

Furthermore, selecting a high-addressable quantization resolution can include selecting from among a plurality of possible high-addressable quantization resolutions. For instance, selecting 718 a quantization resolution can include selecting a first high-addressable quantization resolution if the contone value of the target pixel and/or contone values of selected neighboring pixels indicate that the target pixel is within a first distance range of an edge of a halftone structure and selecting a second high-addressable quantization resolution if the contone value of the target pixel and/or contone values of the selected neighboring pixels indicate that the pixel is within a second distance range of the edge of the halftone structure.

Quantizing 722 the contone value of the target pixel can include spatial quantization. For example, quantizing 722 the contone value of the target pixel can include quantizing the contone value according to a high-addressable quantization and selecting high-addressable subpixels for mark placement in accord with the quantization and a goal of the rendering process. For instance, a goal of the rendering process may be to render compact halftone dots, lines or other halftone structures. For instance, where a target pixel is near an edge of a halftone structure, subpixels of the target pixel nearest the dark portion of that edge may be selected to receive marks in accord with the quantization.

Halftoning 726 the target pixel through an error diffusion process can include using a standard error diffusion technique (ED) or a rank ordered error diffusion technique (ROED). Alternatively, halftoning 726 the target pixel can include halftoning the target pixel according to a blended combination of two or more error diffusion techniques, such as, for example, a blended combination of ED and ROED as described above with reference to FIG. 1 and FIG. 3-FIG. 6.

Figure 8:
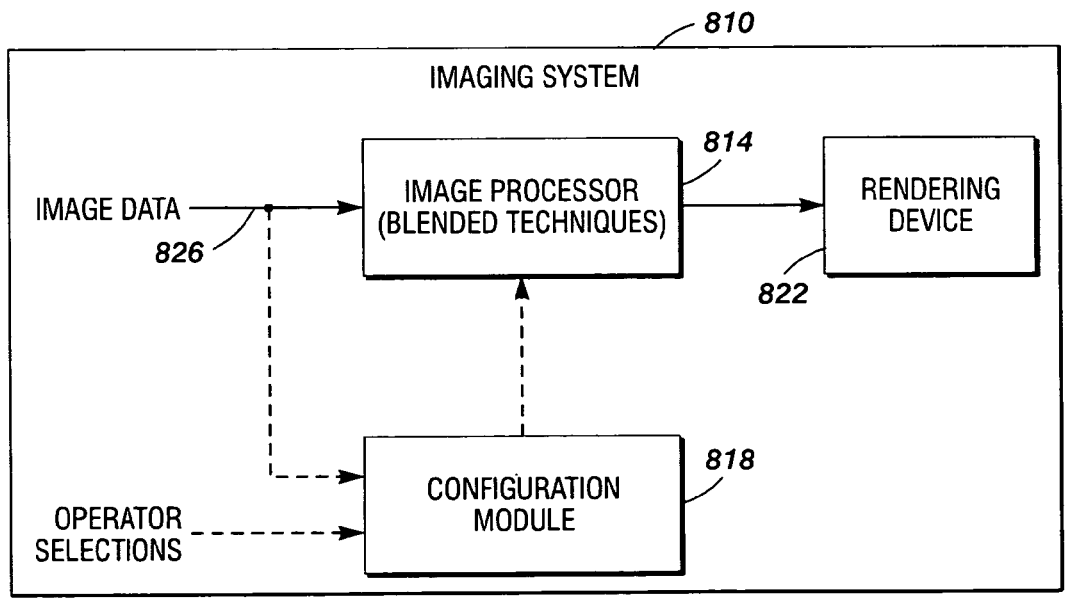
FIG. 8 is a block diagram of a system that is operative to perform the methods of FIG. 1 and FIG. 7.

Referring to FIG. 8, an imaging system operative to perform the methods 110, 710 for halftoning an image includes an image processor 814. Optionally, the imaging system 810 includes a configuration module 818 and/or a rendering device 822.

For example, the image processor 814 is operative to receive an image, select a target pixel from the image, quantize the target pixel, determine a quantization error value based on the quantization of the target pixel and distribute error to pixels neighboring the target pixel according to a blended combination of at least two error diffusion techniques. Additionally, or alternatively, the image processor 814 may be operative to select 718 the quantization resolution for the target pixel from a plurality of possible quantization resolutions based on a relative position of the target pixel within an image.

For example, information regarding the relative position of the target pixel may be determined 210 from a contone value of the target pixel and/or contone values of pixels neighboring the target pixel. For instance, binary quantization may be used 214 when the target pixel is determined 210 to be near a center or spaced well away from a halftone structure such as a dot or line. High-addressable quantization may be used 218 when the relative position of the target pixel is determined 210 to be near an edge of a halftone structure.

The image processor 814 can be operative to distribute 126 error to pixels neighboring the target pixel according to a blended combination of at least two error diffusion techniques by distributing 430 error according to a blended combination of a value of each respective neighboring pixels and a ranking offset of the respective pixel position of each neighboring pixel. For instance, the contribution of the pixel value and a contribution of the ranking offset to the blended combination can be functions of the blending factor value.

For instance, the configuration module 818 can be operative to select 414 or determine an error distribution mask for identifying pixels of an image neighboring target pixels of the image as potential recipients of distributed or diffused error. The configuration module 818 may also be operative to select 418 or determine ranking offsets in association with pixel locations in the error diffusion mask and/or to select 422 or determine diffusion coefficients in association with pixel locations in the error diffusion mask. The configuration module 818 may also be operative to determine a blending factor value for controlling a degree of blending of the at least two error diffusion techniques.

For example, the configuration module 818 may be operative to select 414 an error diffusion mask (e.g., 310, 510, 614), determine 418 the ranking offsets, determine 422 the diffusion coefficients and determine 526 a blending factor by receiving designations from an external source. For example, the configuration module 818 may receive error distribution mask, ranking offset, diffusion coefficient and blending factor designations from a system operator. Alternatively, the configuration module 818 analyzes image data 826 and selects one or more of the error distribution mask, ranking offsets, diffusion coefficients and blending factor based on one or more characteristics of the image data 826 and/or of the imaging system 810. In other embodiments, those parameters may be selected at system design time and incorporated within the image processor 814 or configuration module 818.

However the selections 414, 418, 422, 426 or determinations are made, the image processor 814 may be operative to distribute 126 error to pixels neighboring the target pixels according to a blended combination of at least two error diffusion techniques by distributing 430 the error according to the selected 414, 418, 422, 426 distribution mask, ranking offsets, diffusion coefficients, blending factor and determined 122, 722 quantization error, as described above.

The rendering device 822 may be any rendering device that is operative to produce a viewable version of a quantized target pixel. For instance, the rendering device may be one or more display devices and/or one or more printers or marking engines. For instance, the rendering device 822 may be one or more xerographic marking engines.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for halftoning an image, the method comprising:
    selecting a target pixel from the image;
    quantizing the target pixel;
    determining a quantization error value based on the quantization of the target pixel; and
    distributing error from the determined quantization error to pixels neighboring the target pixel according to a blended combination of at least two error diffusion techniques wherein a degree to which each of the at least two error diffusion techniques contributes an influence to the distribution of error is controlled by a value of a blending factor.

2. The method of claim 1 wherein distributing error to pixels neighboring the target pixel according to a blended combination of at least two error diffusion techniques comprises:
    selecting an error distribution mask for identifying pixels neighboring target pixels as potential recipients of distributed error;
    selecting ranking offsets in association with pixel locations in the error distribution mask;
    selecting diffusion coefficients in association with pixel locations in the error distribution mask;
    selecting the blending factor value;
    distributing error to pixels neighboring the target pixel according to the distribution mask, ranking offsets, diffusion coefficients, blending factor and error value.

3. The method of claim 2 wherein distributing error to pixels neighboring the target pixel comprises:
    ranking the neighboring pixels for receiving error according to a blended combination of a value of each respective neighboring pixel and the ranking offset of the respective pixel position of each neighboring pixel, wherein a contribution of the pixel value and a contribution of the ranking offset to the blended combination are functions of the blending factor value; and
    distributing error to the respective neighboring pixels according to the ranking.

4. The method of claim 3 wherein distributing error to the respective neighboring pixels according to the ranking comprises:
    distributing error to the respective neighboring pixels according to the ranking and a blended combination of an ED term and an ROED term for each respective neighboring pixel.

5. The method of claim 4 wherein distributing the error comprises:
    distributing the error to the respective neighboring pixels according to the ranking and a blended combination of the ED term and the ROED term, wherein the ED term is a product of the determined error value and the respective distribution coefficient associated with the respective mask position of the respective neighboring pixel, and the ROED term is remaining error to be distributed according to the ranking, wherein a contribution of the ED term and a contribution of the ROED term to the blended combination are functions of the blending factor value.

6. The method of claim 4 wherein the ranking of the neighboring pixels and the distributing error to the respective neighboring pixels comprises:
    ranking the neighboring pixels and distributing the error according to the expression:

$$de_n = \min\left[L - p_i, a_{i,2}fe + (1-f)\left(e - \sum_{j=0}^{n-1} de_j\right)\right]; de_0 = 0$$

-continued where $i$ satisfies $([(1-f)p_i + fa_{i,1}] = OS_n[(1-f)p_i + fa_{i,1}], i \in [1, m])$ wherein $OS_n$ is a value of the blended combination of the $n^{th}$ ranked respective neighboring pixel and the ranking offset of the $n^{th}$ ranked respective pixel position, where i is the pixel index within the diffusion mask of the pixel of $n^{th}$ ranked blended value, f is the blending factor and is selected to have a value in the range of 0 to 1, $p_i$ is a contone value of the $i^{th}$ pixel in the error distribution mask, $a_{i,1}$ is the ranking offset of the $i^{th}$ pixel in the error distribution mask, e is the quantization error, $de_n$ is the error distributed to the $n^{th}$ ranked neighboring pixel, $a_{i,2}$ is the diffusion coefficient of the $i^{th}$ pixel in the error distribution mask, j is an index ranging in value from 0 to n−1, m is a number of participating pixel locations within the error diffusion mask and L is a selected maximum contone pixel value limit.

7. The method of claim 3 wherein the ranking of the neighboring pixels and the distributing error to the respective neighboring pixels comprises:

ranking the neighboring pixels and distributing the error according to the expression:

$$de_n = a_{i,2}fe + (1-f)\left(e - \sum_{j=0}^{n-1} de_j\right); de_0 = 0$$

where $i$ satisfies $([(1-f)p_i + fa_{i,1}] = OS_n[(1-f)p_i + fa_{i,1}], i \in [1, m])$ wherein $OS_n$ is a value of the blended combination of the $n^{th}$ ranked respective neighboring pixel and the ranking offset of the $n^{th}$ ranked respective pixel position, where i is the pixel index within the diffusion mask of pixel of $n^{th}$ ranked blended value, f is the blending factor and is selected to have a value in the range of 0 to 1, $p_i$ is a contone value of the $i^{th}$ pixel in the error distribution mask, $a_{i,1}$ is the ranking offset of the $i^{th}$ pixel in the error distribution mask, e is the quantization error, $de_n$ is the error distributed to the $n^{th}$ ranked neighboring pixel, $a_{i,2}$ is the diffusion coefficient of the $i^{th}$ pixel in the error distribution mask, j is an index ranging in value from 0 to n−1, and m is a number of participating pixel locations within the error diffusion mask.

8. The method of claim 3 wherein selecting ranking offsets comprise:

selecting ranking offsets that effectively select a number of pixels from the error diffusion mask to receive distributed error that varies based on the selected blending factor value.

9. The method of claim 8 wherein selecting ranking offsets that effectively select a number of pixels from the error diffusing mask to receive distributed error that varies based on the selected blending factor value comprises:

selecting ranking offset values of 0 for error mask pixel positions which are not to receive error when the blending factor value is such that the blending factor selects pure regular error diffusion (ED).

10. The method of claim 8 wherein selecting ranking offsets that effectively select a number of pixels from the error diffusing mask to receive distributed error that varies based on the selected blending factor value comprises:

ranking the neighboring pixels and distributing the error according to the expression:

$$de_n = \min\left[L - p_i, a_{i,3}fe + (1-f)\left(e - \sum_{j=0}^{n-1} de_j\right)\right]; de_0 = 0$$

where $i$ satisfies $([(1-f)(p_i + a_{i,2}) + fa_{i,1}] = OS_n[(1-f)(p_i + a_{i,2})fa_{i,1}], i \in [1, m])$ wherein $OS_n$ is a value of the blended combination of the $n^{th}$ ranked respective neighboring pixel and the ranking offset of the $n^{th}$ ranked respective pixel position, where i is the pixel index within the diffusion mask of pixel of $n^{th}$ ranked blended value, f is the blending factor and is selected to have a value in the range of 0 to 1, $p_i$ is a contone value of the $i^{th}$ pixel in the error distribution mask, $a_{i,1}$ is the ED ranking offset of the $i^{th}$ pixel in the error distribution mask, $a_{i,2}$ is the ROED ranking offset of the $i^{th}$ pixel in the error distribution mask, e is the quantization error, $de_n$ is the error distributed to the $n^{th}$ ranked neighboring pixel, $a_{i,3}$ is the diffusion coefficient of the $i^{th}$ pixel in the error distribution mask, j is an index ranging in value from 0 to n−1, m is a number of participating pixel locations within the error diffusion mask and L is a selected maximum contone pixel value limit, and selecting ED ranking offsets and ROED ranking offsets, wherein the ROED ranking offsets include values of 0 for error mask pixel positions which are not to receive error when the blending factor value is such that the blending factor selects pure rank ordered error diffusion (ROED).

11. The method of claim 2 wherein quantizing the target pixel comprises:

quantizing the target pixel to one of two binary values according to a single threshold.

12. The method of claim 2 wherein quantizing the target pixel comprises:

quantizing the target pixel to one of at least three high addressable quantization values according to at least two high addressable quantization thresholds.

13. The method of claim 2 wherein quantizing the target pixel comprises:

determining a relative position of the target pixel with respect to a halftone structure;

using binary quantization if the target pixel is near a center of the halftone structure or if the target pixel is spaced away from the halftone structure; and using high addressable quantization if the target pixel is near an edge of the a halftone structure.

14. The method of claim 13 wherein using high addressable quantization comprises:

quantizing the target pixel to a first high addressable quantization resolution if the target pixel is within a first distance range of the edge of the halftone structure; and quantizing the target pixel to a second high addressable resolution if the pixel is within a second distance range of the edge of the halftone structure.

15. The method of claim 2 wherein quantizing the target pixel comprises:

selecting one of a plurality of quantization resolutions based on a pixel value of the target pixel; and quantizing the pixel value at the selected quantization resolution.

16. A method for halftoning an image, the method comprising:

selecting a target pixel from the image;

selecting a quantization resolution for the target pixel from a plurality of possible quantization resolutions based on a contone value of the target pixel and/or based on contone values of pixels neighboring the target pixel;

quantizing the pixel value of the target pixel according to the selected quantization resolution; and halftoning the selected target pixel through an error diffusion process in accord with the quantization.

17. The method of claim 16 wherein selecting the quantization resolution comprises:

selecting a binary quantization resolution if the contone value of the target pixel and/or contone values of selected neighboring pixels are equal to or below a low quantization resolution selection threshold or equal to or above a high quantization resolution selection threshold.

18. The method of claim 16 wherein selecting the quantization resolution comprises:

selecting a high addressable quantization resolution if the contone value of the target pixel and/or contone values of selected neighboring pixels are above a low quantization resolution selection threshold and below a high quantization resolution selection threshold.

19. The method of claim 16 wherein selecting the quantization resolution comprises:

selecting a first high addressable quantization resolution if the contone value of the target pixel and/or contone values of the selected neighboring pixels indicate that the target pixel is within a first distance range of an edge of a halftone structure; and selecting a second high addressable quantization resolution if the contone value of the target pixel and/or contone values of the selected neighboring pixels indicate that the pixel is within a second distance range of the edge of the halftone structure.

20. The method of claim 16 wherein quantizing the contone value of the target pixel comprises:

quantizing the contone value according to a high addressable quantization resolution, and selecting high addressable sub-pixels for mark placement in accord with the quantization and a goal of the rendering process.

21. The method of claim 20 wherein selecting the high addressable sub-pixels for mark placement in accord with the quantization and a goal of the rendering process comprises:

selecting high addressable sub-pixels for mark placement in accord with the quantization and one of a goal of halftone dot compaction and a goal of halftone line compaction.

22. The method of claim 16 wherein halftoning the selected target pixel through an error diffusion process comprises:

selecting a target pixel from the image;

quantizing the target pixel;

determining a quantization error value based on the quantization of the target pixel; and distributing error from the determined quantization error to pixels neighboring the target pixel according to a blended combination of at least two error diffusion techniques.

23. The method of claim 22 wherein distributing error to pixels neighboring the target pixel comprises:

selecting an error distribution mask for identifying pixels neighboring target pixels as potential recipients of distributed error;

selecting ranking offsets in association with pixel locations in the error distribution mask;

selecting diffusion coefficients in association with pixel locations in the error distribution mask;

selecting a blending factor value;

selecting a target pixel from the image;

determining a quantization error value based on the quantization of the target pixel; and distributing error from the determined quantization error to pixels neighboring the target pixel according to the distribution mask, ranking offsets, diffusion coefficients, blending factor and error value.

24. An imaging system comprising:

an image processor that is operative to receive an image, select a target pixel from the image, quantize the target pixel, determine a quantization error value based on the quantization of the target pixel and distribute error from the determined quantization error to pixels neighboring the target pixel according to a blended combination of at least two error diffusion techniques, and a configuration module that is operative to select an error distribution mask for identifying pixels of an image, neighboring target pixels of the image, as potential recipients of distributed error, determine ranking offsets in association with pixel locations in the error distribution mask, determine diffusion coefficients in association with pixel locations in the error distribution mask and determine a blending factor value for controlling a degree of blending of two error diffusion techniques, wherein the image processor is operative to distribute error to pixels neighboring the target pixel according to the distribution mask, ranking offsets, diffusion coefficients, blending factor and error value.

25. The imaging system of claim 24 wherein the configuration module is operative to at least one of select the error distribution mask, determine the ranking offsets, determine the diffusion coefficients and determine the blending factor value by receiving a designation from an external source.

26. The imaging system of claim 24 wherein the configuration module is operative to at least one of select the error distribution mask, determine the ranking offsets, determine the diffusion coefficients and determine the blending factor value by determining at least one aspect of the image and making the selection or determination based on the determined at least one aspect.

27. The imaging system of claim 24 wherein the image processor is operative to distribute the error to pixels neighboring the target pixel by ranking the neighboring pixels for receiving error according to a blended combination of a value of each respective neighboring pixel and the ranking offset of the respective pixel position of each neighboring pixel, wherein a contribution of the pixel value and a contribution of the ranking offset to the blended combination are functions of the blending factor value; and distributing error to the respective neighboring pixels according to the ranking.

28. The imaging system of claim 24 wherein the image processor is operative to distribute the error to the respective neighboring pixels by distributing error to the respective neighboring pixels according to the ranking and a blended combination of an ED term and an ROED term for each respective neighboring pixel.

29. The imaging system of claim 28 wherein the image processor is operative to distribute the error by distributing error to the respective neighboring pixels according to the ranking and a blended combination of the ED term and the ROED term, wherein the ED term is a product of the determined error value and the respective distribution coefficient associated with the respective mask position of the respective neighboring pixel, and the ROED term is remaining error to be distributed according to the ranking, wherein a contribution of the ED term and a contribution of the ROED term to the blended combination are functions of the blending factor value.

30. The imaging system of claim 28 wherein the image processor is operative to rank the neighboring pixels and distribute the error to the respective neighboring pixels by ranking the neighboring pixels and distributing the error according to the expression:

$$de_n = \min\left[L - p_i, a_{i,2}fe + (1-f)\left(e - \sum_{j=0}^{n-1} de_j\right)\right]; de_0 = 0$$

where $i$ satisfies $([(1-f)p_i + fa_{i,1}] = OS_n[(1-f)p_i + fa_{i,1}], i \in [1, m])$ wherein $OS_n$ is a value of the blended combination of the $n^{th}$ ranked respective neighboring pixel and the ranking offset of the $n^{th}$ ranked respective pixel position, where i is the pixel index within the diffusion mask of pixel of $n^{th}$ ranked blended value, f is the blending factor and is selected to have a value in the range of 0 to 1, $p_i$ is a contone value of the $i^{th}$ pixel in the error distribution mask, $a_{i,1}$ is the ranking offset of the $i^{th}$ pixel in the error distribution mask, e is the quantization error, $de_n$ is the error distributed to the $n^{th}$ ranked neighboring pixel, $a_{i,2}$ is the diffusion coefficient of the $i^{th}$ pixel in the error distribution mask, j is an index ranging in value from 0 to n−1, m is a number of participating pixel locations within the error diffusion mask and L is a selected maximum contone pixel value limit.

31. The imaging system of claim 28 wherein the image processor is operative to rank the neighboring pixels and distribute the error according to the expression:

$$de_n = a_{i,2}fe + (1-f)\left(e - \sum_{j=0}^{n-1} de_j\right); de_0 = 0$$

where $i$ satisfies $([(1-f)p_i + fa_{i,1}] = OS_n[(1-f)p_i + fa_{i,1}], i \in [1, m])$ wherein $OS_n$ is a value of the blended combination of the $n^{th}$ ranked respective neighboring pixel and the ranking offset of the $n^{th}$ ranked respective pixel position, where i is the pixel index within the diffusion mask of pixel of $n^{th}$ ranked blended value, f is the blending factor and is selected to have a value in the range of 0 to 1, $p_i$ is a contone value of the $i^{th}$ pixel in the error distribution mask, $a_{i,1}$ is the ranking offset of the $i^{th}$ pixel in the error distribution mask, e is the quantization error, $de_n$ is the error distributed to the $n^{th}$ ranked neighboring pixel, $a_{i,2}$ is the diffusion coefficient of the $i^{th}$ pixel in the error distribution mask, j is an index ranging in value from 0 to n−1, and m is a number of participating pixel locations within the error diffusion mask.

32. The imaging system of claim 24 wherein the configuration module is operative determine the ranking offsets by selecting ranking offsets that effectively select a number of pixels from the error diffusion mask to receive distributed error that varies based on the selected blending factor value.

33. The imaging system of claim 32 wherein the configuration module is operative to select ranking offsets that effectively select a number of pixels that varies based on the selected blending factor value by selecting ranking offset values of 0 for error mask pixel positions which are not to receive error when the blending factor value is such that the blending factor selects pure regular error diffusion (ED).

34. The imaging system of claim 32 wherein the configuration module is operative to select ranking offsets that effectively select a number of pixels that varies based on the selected blending factor value by ranking the neighboring pixels and distributing the error according to the expression:

$$de_n = \min\left[L - p_i, a_{i,3}fe + (1-f)\left(e - \sum_{j=0}^{n-1} de_j\right)\right]; de_0 = 0$$

where $i$ satisfies:

$([(1-f)(p_i + a_{i,2}) + fa_{i,1}] = OS_n[(1-f)(p_i + a_{i,2})fa_{i,1}], i \in [1, m])$ wherein $OS_n$ is a value of the blended combination of the $n^{th}$ ranked respective neighboring pixel and the ranking offset of the $n^{th}$ ranked respective pixel position, where i is the pixel index within the diffusion mask of the pixel of $n^{th}$ ranked blended value, f is the blending factor and is selected to have a value in the range of 0 to 1, $p_i$ is a contone value of the $i^{th}$ pixel in the error distribution mask, $a_{i,1}$ is the ED ranking offset of the $i^{th}$ pixel in the error distribution mask, $a_{i,2}$ is the ROED ranking offset of the $i^{th}$ pixel in the error distribution mask, e is the quantization error, $de_n$ is the error distributed to the $n^{th}$ ranked neighboring pixel, $a_{i,3}$ is the diffusion coefficient of the $i^{th}$ pixel in the error distribution mask, j is an index ranging in value from 0 to n−1, m is a number of participating pixel locations within the error diffusion mask and L is a selected maximum contone pixel value limit, and selecting ED ranking offsets and ROED ranking offsets, wherein the ROED ranking offsets include values of 0 for error mask pixel positions which are not to receive error when the blending factor value is such that the blending factor selects pure rank ordered error diffusion (ROED).

35. The imaging system of claim 24 wherein the image processor is operative to quantize the target pixel by determining a relative position of the target pixel with respect to a halftone structure, using binary quantization if the target pixel is near a center of the halftone structure or if the target pixel is spaced away from the halftone structure and using high addressable quantization if the target pixel is near an edge of the a halftone structure.

36. The imaging system of claim 35 wherein the image processor is operative to use high addressable quantization by quantizing the target pixel to a first high addressable quantization resolution if the target pixel is within a first distance range of the edge of the halftone structure and quantizing the target pixel to a second high addressable resolution if the pixel is within a second distance range of the edge of the halftone structure.

37. The imaging system of claim 24 wherein the image processor is operative to quantize the target pixel by selecting one of a plurality of quantization resolutions based on a pixel value of the target pixel and quantizing the pixel value at the selected quantization resolution.

38. The imaging system of claim 24 further comprising:
a rendering device that is operative to produce a viewable version of the quantized target pixel.

39. The imaging system of claim 24 wherein the rendering device comprises:
at least one xerographic marking engine.

* * * * *